United States Patent
Song et al.

(10) Patent No.: US 7,410,535 B2
(45) Date of Patent: Aug. 12, 2008

(54) CYCLONE SEPARATING APPARATUS AND A VACUUM CLEANER HAVING THE SAME

(75) Inventors: Hwa-Gyu Song, Gwangju (KR);
Jae-Man Joo, Gyeonggi-do (KR);
Jun-Hwa Lee, Gyeonggi-do (KR);
Jang-Kuen Oh, Gwangju (KR);
Sung-Cheol Lee, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 511 days.

(21) Appl. No.: 11/072,821

(22) Filed: Mar. 4, 2005

(65) Prior Publication Data
US 2006/0037479 A1 Feb. 23, 2006

(30) Foreign Application Priority Data
Aug. 23, 2004 (KR) ............ 10-2004-0066366
Sep. 16, 2004 (KR) ............ 10-2004-0074229

(51) Int. Cl.
*B01D 45/12* (2006.01)

(52) U.S. Cl. ............ 96/385; 55/414; 55/429; 55/459.1; 55/DIG. 3; 15/350; 15/353

(58) Field of Classification Search ............ 55/414, 55/416, 429, 459.1, DIG. 3; 96/385; 15/350, 15/353
See application file for complete search history.

(56) References Cited

U.S. PATENT DOCUMENTS

| | | | |
|---|---|---|---|
| 1,766,237 A | 6/1930 | Whitmore | |
| 1,913,115 A | 6/1933 | Guest | |
| 2,542,635 A * | 2/1951 | Davis et al. | 55/399 |
| 2,771,157 A | 11/1956 | Gustavsson | 183/83 |
| 2,936,043 A * | 5/1960 | Armstrong et al. | 55/416 |
| 5,013,342 A | 5/1991 | Leussler et al. | 55/337 |
| 5,180,257 A | 1/1993 | Narishima et al. | 406/173 |
| 5,180,275 A | 1/1993 | Narishima et al. | 406/173 |
| 5,466,372 A | 11/1995 | Jerabek et al. | 210/512.1 |

(Continued)

FOREIGN PATENT DOCUMENTS

DE 4309920 8/1993

(Continued)

OTHER PUBLICATIONS

Official Action dated May 30, 2006 issued from the Russian Patent Office with respect to Russian Patent Application No. 2005112150 filed on Apr. 15, 2005 and English translation.

(Continued)

*Primary Examiner*—Robert A Hopkins
(74) *Attorney, Agent, or Firm*—Ohlandt, Greeley, Ruggiero & Pearle, LLP

(57) ABSTRACT

A cyclone separating apparatus and a vacuum cleaner having the same are provided. The cyclone separating apparatus includes a cyclone body including a cyclone chamber and a dust collecting chamber, a cover unit connected to an upper portion of the cyclone body, a door unit openably mounted to a bottom portion of the cyclone body, and at least one noise reducing rib formed in an air discharging pipe in the cyclone chamber.

19 Claims, 6 Drawing Sheets

U.S. PATENT DOCUMENTS

| | | | |
|---|---|---|---|
| 6,269,518 B1 * | 8/2001 | Yung | 15/352 |
| 6,425,931 B1 | 7/2002 | Croggon | 55/414 |
| 6,679,930 B1 | 1/2004 | An et al. | 55/337 |

FOREIGN PATENT DOCUMENTS

| | | |
|---|---|---|
| DE | 134360 | 10/2001 |
| DE | 10056935 | 2/2006 |
| DE | 102005008475 A1 | 2/2006 |
| EP | 0616853 | 9/1994 |
| EP | 1199023 | 7/2000 |
| GB | 245636 | 3/1925 |
| GB | 727215 | 6/1953 |
| GB | 2365324 | 10/2000 |
| GB | 2362341 | 2/2001 |
| GB | 2362341 | 11/2001 |
| GB | 2399780 A | 9/2004 |
| JP | 56-106158 | 1/1955 |
| JP | 52-149666 | 12/1977 |
| JP | 52149666 | 12/1977 |
| JP | 2002541957 | 12/2002 |
| JP | 2003-135334 | 5/2003 |
| JP | 2003-153840 | 5/2003 |
| KR | 1020030060540 A | 7/2003 |
| RU | 220642 | 7/2003 |
| SU | 187766 A | 11/1965 |
| WO | WO 99/49978 | 10/1999 |
| WO | 00/64321 | 11/2000 |
| WO | WO 02/067756 | 9/2002 |
| WO | WO02/067756 | 9/2002 |

OTHER PUBLICATIONS

British Combined Search and Examination Report dated Jul. 25, 2005.

British Combined Search and Examination Report dated Aug. 11, 2006 issued in connection to British Patent Application No. 0607824.0 filed on Apr. 20, 2006.

Office Action issued from Chinese Patent Office with respect to Chinese Patent Application No. 200510065755.0 dated Nov. 17, 2006 pp. 1-12.

Office Action dated Apr. 26, 2007 from corresponding German Patent Application No. 102005017274.1.

Office Action dated Jul. 9, 2007 from corresponding Spanish Patent Application No. 200501017.

International Seach Report dated Jun. 29, 2007 from corresponding French Patent Application No. 0503539.

Office Action dated Nov. 6, 2007 corresponding to Japanese Patent Application No. 2005-45820.

* cited by examiner

| CLASSIFICATION | | ![317/314](cylinder with blades) |
|---|---|---|
| LOSS OF PRESSURE (mmH₂O) | 527 | 472 |
| NOISE (dB(A)) | 83.6 | 80.8 |

CYCLONE SEPARATING APPARATUS AND A VACUUM CLEANER HAVING THE SAME

CROSS-REFERENCE TO RELATED APPLICATIONS

This application claims the benefit of Korean Patent Applications No. 2004-66366 filed Aug. 23, 2004 and No. 2004-74229 filed Sep. 16, 2004, in the Korean Intellectual Property Office, the disclosures of which are incorporated herein by reference.

BACKGROUND OF THE INVENTION

1. Field of the Invention

The present invention relates to a cyclone separating apparatus and a vacuum cleaner having the same.

2. Description of the Related Art

In general cyclone separating apparatuses, dust-laden air drawn in through a suction path is separated into cleaned air and impurities such as dust. The separated dust is passed through a dust discharging pipe and collected to a dust collecting chamber, and the cleaned air is discharged through an air discharging pipe to the outside of the cyclone separating apparatus. During this, the cleaned air being discharged through the air discharging pipe becomes a whirling air current, and flow of the whirling air current causes a noise and loss of pressure.

To overcome the above problem, an air discharging pipe configured to have an increasing diameter toward an air-inlet side thereof has been introduced, which is disclosed in KR 2001-0099572 filed by LG Electronics Inc. Also, a structure wherein a streamlined slant body is disposed in the center of an air discharging pipe is disclosed in WO 02067756 filed by Dyson.

However, in those cases by LG Electronics Inc. and Dyson, the noise and loss of pressure due to the whirling air current generated at an outer wall of the air discharging pipe can not be restrained. Especially in the Dyson's case, the streamlined slant body and a supporting structure for the same may obstruct the dust included in the air, thereby causing block of the air discharging pipe.

SUMMARY OF THE INVENTION

An aspect of the present invention is to solve at least the above problems and/or disadvantages and to provide at least the advantages described below. Accordingly, an aspect of the present invention is to provide a cyclone separating apparatus improved to reduce a noise and loss of pressure, and a vacuum cleaner having the same.

In order to achieve the above-described aspects of the present invention, there is provided a cyclone separating apparatus comprising a cyclone body including a cyclone chamber and a dust collecting chamber, a cover unit connected to an upper portion of the cyclone body, a door unit openably mounted to a bottom portion of the cyclone body, and at least one noise reducing rib formed in an air discharging pipe in the cyclone chamber.

The noise reducing rib is protruded on an inner wall of the air discharging pipe toward a center of the air discharging pipe and comprises a curve portion and a straight portion.

The curve portion is disposed at an inlet of the air discharging pipe while the straight portion is disposed at an outlet of the air discharging pipe. A free end of the curve portion is rounded to avoid congestion of the dust.

In some embodiments, a plurality of the noise reducing ribs are provided at a predetermined interval on the inner wall of the air discharging pipe.

In another embodiment, four noise reducing ribs are provided, and the curve portion thereof is bent in a certain direction.

The noise reducing ribs respectively have a width approximately 0.1 to 0.4 times as large as an inner diameter of the air discharging pipe.

The noise reducing ribs are formed on the inner wall of the air discharging pipe from a certain depth from a top of the air discharging pipe and formed in a certain length toward the center of the air discharging pipe so as not to reach the center of the air discharging pipe.

The air discharging pipe has a substantially circular section, and four noise reducing ribs are formed on X-Y coordinates crossing a central axis of the air discharging pipe.

The noise reducing ribs have a width of approximately 0.1 to 0.4 times as large as the inner diameter of the air discharging pipe.

Another aspect of the present invention is to provide a cleaner body having a driving motor; a suction brush connected to the cleaner body to draw in dust on a surface being cleaned; and a cyclone separating apparatus detachably mounted to the cleaner body to separate the dust from dust-laden air drawn in through the suction brush, and wherein the cyclone separating apparatus comprises a cyclone body including a cyclone chamber and a dust collecting chamber, a cover unit connected to an upper portion of the cyclone body, a door unit openably mounted to a bottom portion of the cyclone body, and at least one noise reducing rib formed in an air discharging pipe in the cyclone chamber.

The noise reducing rib is protruded on an inner wall of the air discharging pipe toward a center of the air discharging pipe and comprises a curve portion and a straight portion.

The noise reducing ribs are formed on the inner wall of the air discharging pipe from a certain depth from a top of the air discharging pipe and formed in a certain length toward the center of the air discharging pipe so as not to reach the center of the air discharging pipe.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
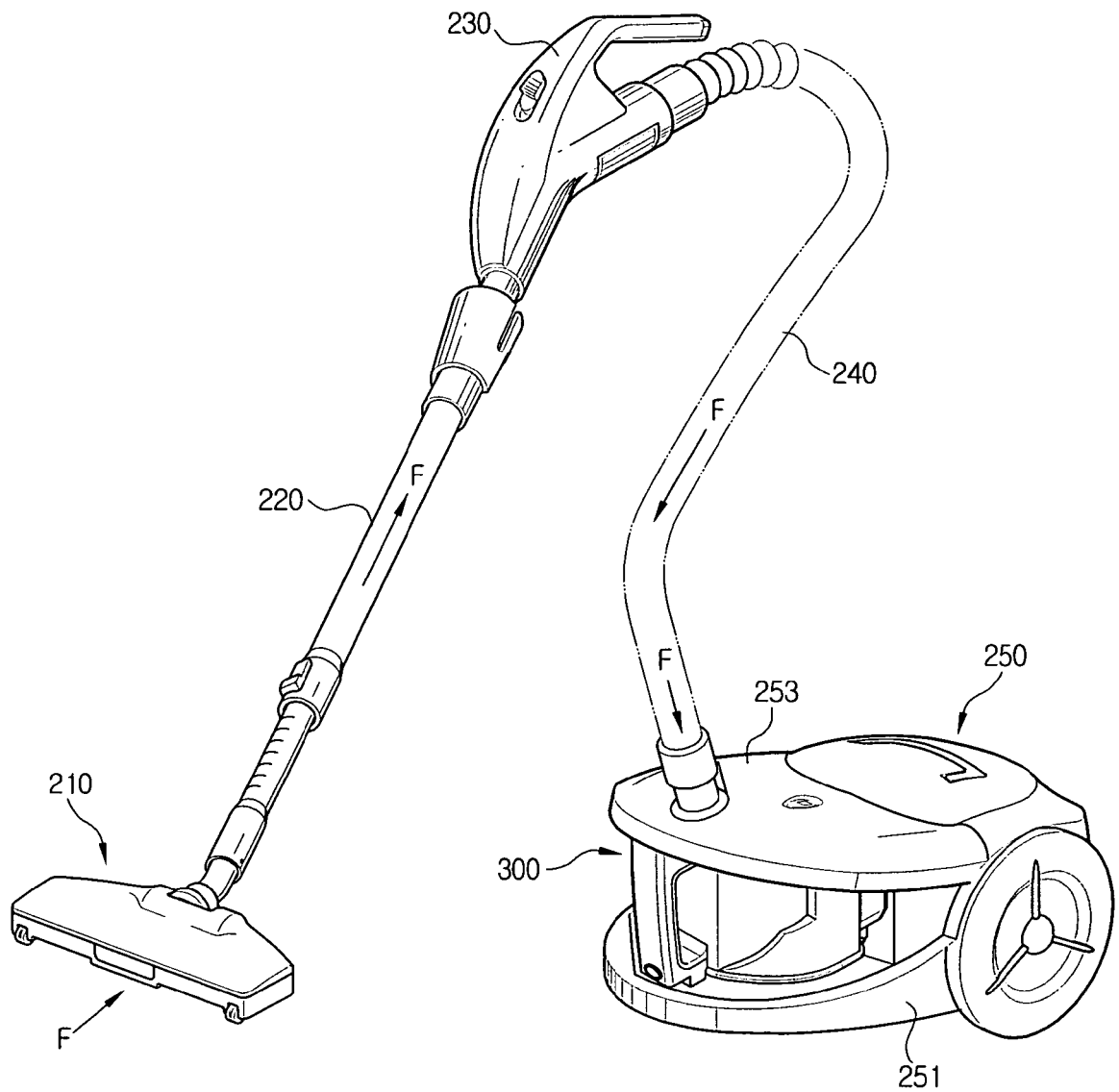
FIG. 1 is a perspective view schematically showing a vacuum cleaner having a cyclone separating apparatus according to an embodiment of the present invention.

Hereinafter, an embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Referring to FIG. 1, a vacuum cleaner 200 comprises a cleaner body 250, a suction brush 210 for drawing in impurities such as dust on a surface being cleaned, an operation part 230 for manipulation of the vacuum cleaner 200, an extension pipe 220 for connecting the suction brush 210 and the operation part 230, a flexible hose 240 for connecting the operation part 230 and the cleaner body 250, and a cyclone separating apparatus 300.

A driving motor (not shown), as a driving source for supplying a suction force, is mounted in the cleaner body 250. The cyclone separating apparatus 300 is detachably mounted in the cleaner body 250 to centrifugally separate dust included in air.

Figure 2:
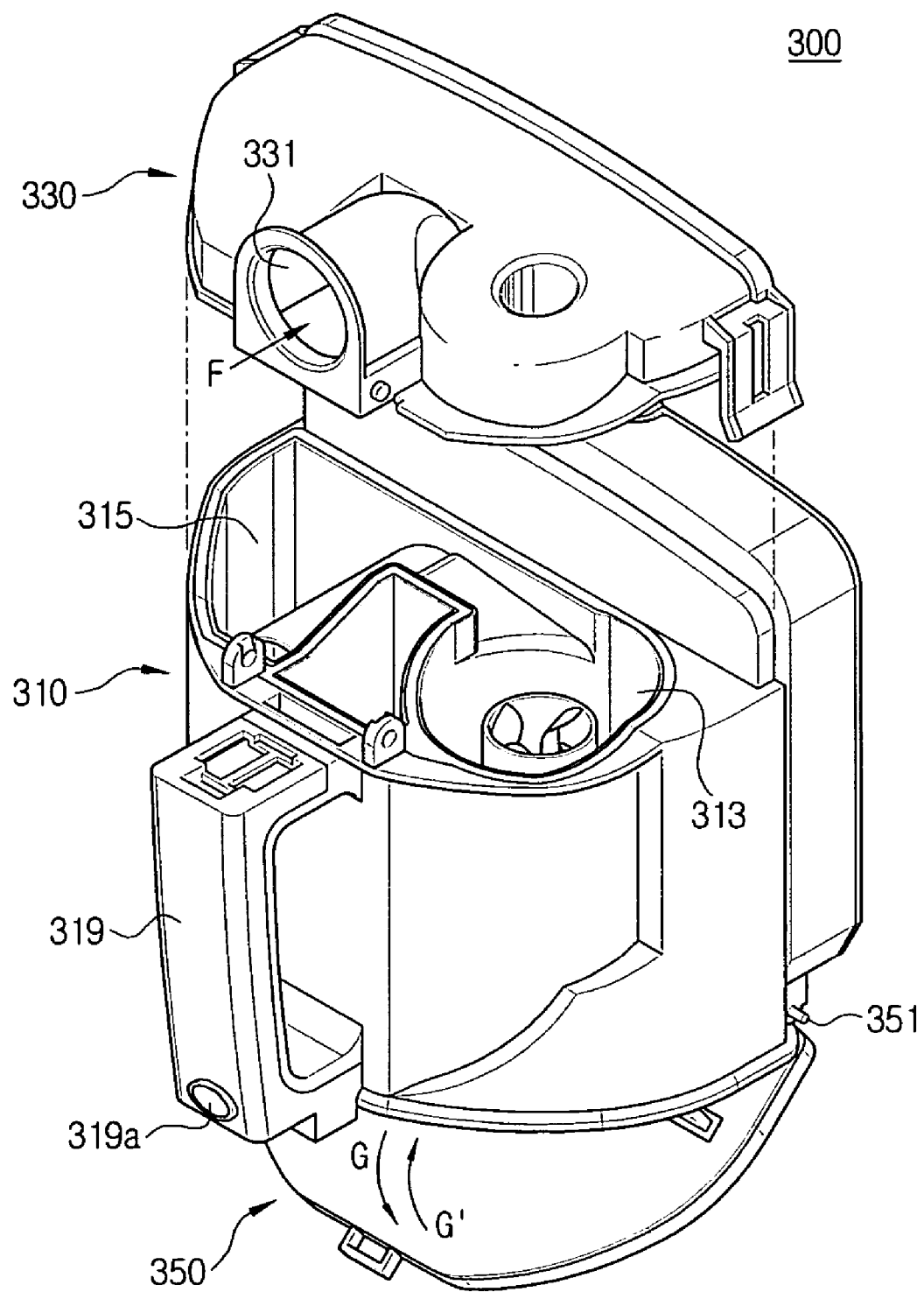
FIG. 2 is an exploded and perspective view of the cyclone separating apparatus of FIG. 1.

Referring to FIG. 2, the cyclone separating apparatus 300 comprises a cover unit 330, a door unit 350 and a cyclone body 310.

The cover unit 330 is removably mounted to an upper end of the cyclone body 310. By mounting the cover unit 330 to the cyclone body 310, a dust path (not shown) is spontaneously formed between the cyclone chamber 313 and the dust collecting chamber 315. The dust centrifuged from dust-laden air in the cyclone chamber 313 is moved to the dust collecting chamber 315 through the dust path (not shown).

By separating the cover unit 330 from the cyclone body 310, the cyclone chamber 313 and the dust collecting chamber 315 become accessible for a user to clean and manage.

A suction path 331 is formed on a front center portion of the cover unit 330 in fluid communication with the flexible hose 240 (FIG. 1).

The door unit 350 is hinged on a lower end of the cyclone body to be opened in 'G' direction and closed in 'G"' direction with respect to a hinge 351. When the door unit 350 is opened, a connection path 311 and the dust collecting chamber 315 are opened at bottoms thereof, so that the dust collected in the connection path 311 and the dust collecting chamber 315 is discharged by gravity.

The door unit 350 is opened in a following system; a button 319a provided to a handle 319 is pressed, and therefore, a hook (not shown) engaged with one side of the door unit 350 recedes. Simultaneously, engagement of the door unit 350 and the hook (not shown) are released. Accordingly, one end of the door unit 350 is rotated with respect to the hinge 351.

In order to close the door unit 350, the user rotates the door unit 350 in 'G"' direction with respect to the hinge 351 so that the hook (not shown) is fastened with the one side of the door unit 350.

Figure 3:
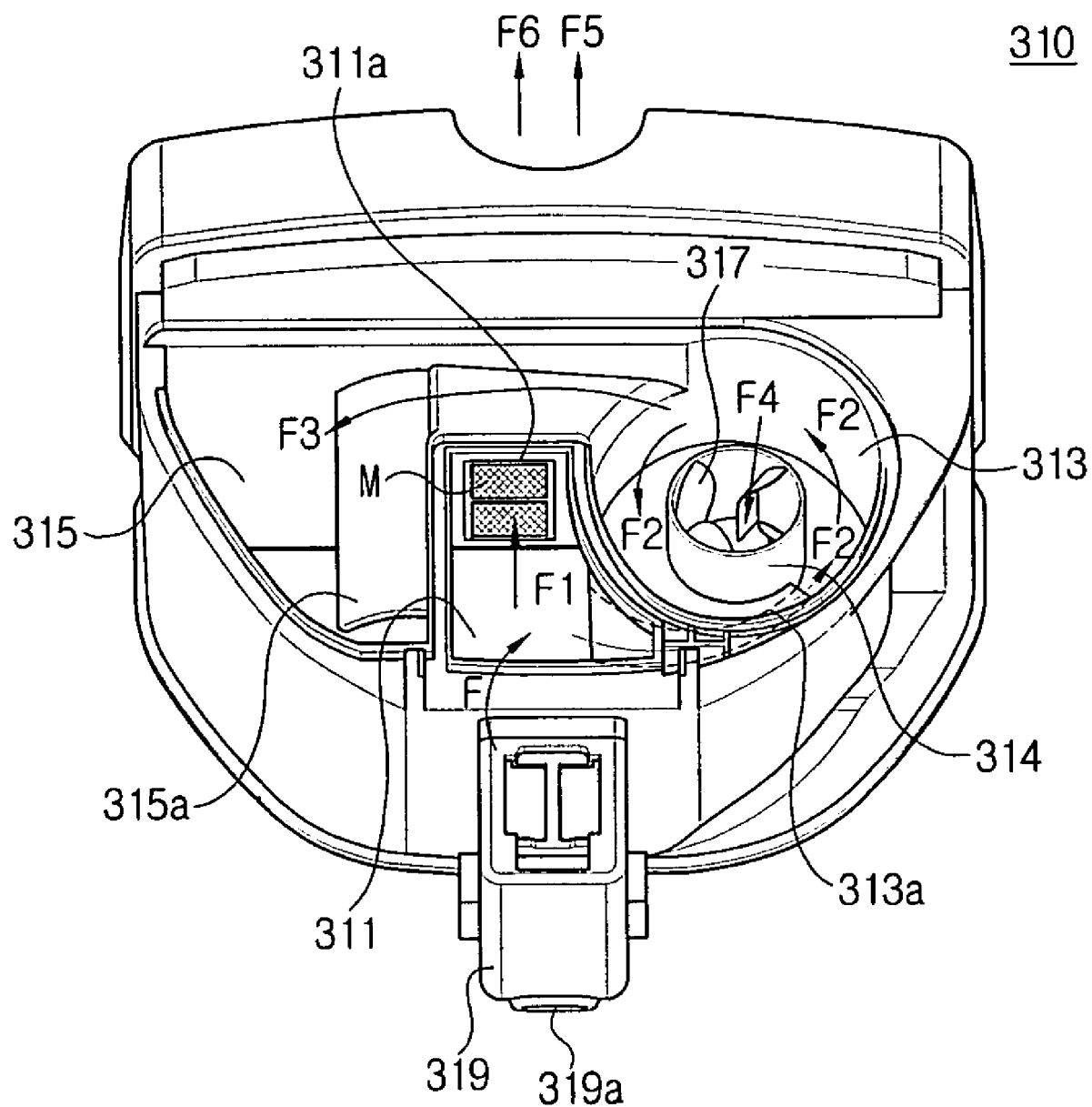
FIG. 3 is a perspective view showing a cyclone body of FIG. 2.

Referring to FIG. 3, the cyclone body 310 comprises the connection path 311, the cyclone chamber 313, the dust collecting chamber 315 and the handle 319.

The connection path 311 is disposed in the middle of the cyclone body 310 and connected to the suction path 331 (FIG. 2) so as to guide the dust-laden air drawn in through the suction path 331 (FIG. 2) toward the cyclone chamber 313. In the suction path 311, a filter mounting hole 311a for mounting a mesh filter M that filters relatively fine dust is formed. The connection path 311 is fluidly communicated with the driving source (not shown) via the mesh filter M. When a bottom of the connection path 311 is open, the dust collected in the connection path 311 can fall to be discharged.

The cyclone chamber 313 is formed on the right of the connection path 311 inside the cyclone body 310 to separate the dust from the dust-laden air using a centrifugal force. In the bottom of the cyclone chamber 313, an air entry path 313a is formed to let the dust-laden air, drawn in through the suction path 331 and the connection path 311, flow into the cyclone chamber 313.

The air discharging pipe 314 having a substantially circular section is protruded by a certain height in the middle of the bottom of the cyclone chamber 313. The air discharging pipe 314 functions as a discharging path for cleaned air from which the dust is separated. The air discharging pipe 314 may be integrally formed with the cyclone chamber 313 or formed as a separate part.

The air discharging pipe 314 has four noise reducing ribs 317 which will be described later.

The dust collecting chamber 315 is disposed on the left of the connection path 311 to collect therein the dust separated in the cyclone chamber 313. A blocking member 315a is provided at one side in the dust collecting chamber 315 to prevent the collected dust from flowing back to the cyclone chamber 313. The blocking member 315a is formed as a substantial arc curved downward with respect to the dust collecting chamber 315. Since a bottom of the dust collecting chamber 315 is open, the dust collected in the chamber 315 can fall by gravity by opening the door unit 350, thereby being discharged.

The handle 319 having a substantially flattened-U shape is mounted on the front of the cyclone body 310 for the user to grip when separating the cyclone body 250 from the cleaner body 310. The button 319a for opening the door unit 350 is disposed at a lower part of the handle 319. Inside the handle 319, a link member (not shown) is formed to connect the button 319a and the hook (not shown).

Figure 4:
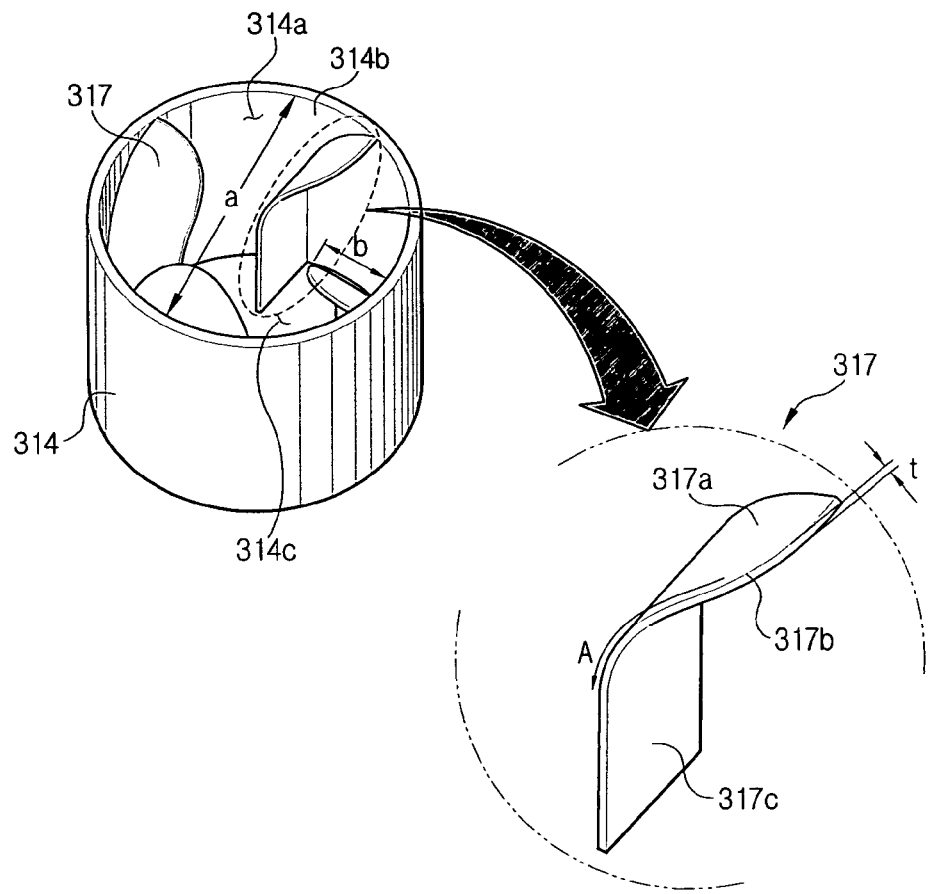
FIG. 4 is an enlarged perspective view of a noise reducing rib and an air discharging pipe of FIG. 3.

Hereinbelow, the structure and the operation of the noise reducing rib 317 provided to the air discharging pipe 314 will be described with reference to FIG. 4.

In order to decrease the noise generated by the cleaned air passing through the air discharging pipe 314 and the loss of pressure, four noise reducing ribs 317 are mounted at an inner wall 314b of the air discharging pipe 314 at regular intervals. The noise reducing ribs 317 can be separately made and attached to the inner wall 314b of the air discharging pipe 314 by an adhesive, or integrally formed with the air discharging pipe 314 to be protruded from the inner wall 314.

The noise reducing rib 317 has a certain thickness 't', and comprises a curve portion 317a and a straight portion 317c in a direction from an inlet 314a to an outlet 314c of the air discharging pipe 314.

The curve portion 317a is disposed at the inlet 314a of the air discharging pipe 314 and curved in 'A' direction to minimize the noise and the loss of pressure, the noise caused by collision of the cleaned air with the curve portion 317a. The four noise reducing ribs 317 are mounted in the same direction on the inner wall 314b of the air discharging pipe 314.

A free end 317b of the curve portion 317a is rounded to avoid congestion of the dust. According to the above structure, a rotating current of the cleaned air flowing to the inlet 314 of the air discharging pipe 314a gradually loses its rotary power due to the curve portion 317a. Therefore, formation of a whirling air current, by collision of a rotary current of the cleaned air with the inner wall 314*b* of the air discharging pipe 314, can be prevented.

The straight portion 317*c* is disposed at the outlet 314*c* of the air discharging pipe 314. The cleaned air that lost the rotary power due to the curve portion 317*a* becomes a straight air current and is guided to the outlet 314*c* of the air discharging pipe 314.

Presuming that a reference numeral 'a' denotes an inner diameter of the air discharging pipe 314, the noise reducing ribs 317 have a width 'b' from an inner wall 314*b* of the air discharging pipe 314 toward the center. Width 'b' is approximately 0.1 to approximately 0.4 of the inner diameter 'a' of the air discharging pipe 314. That is, width 'b' of the noise reducing rib 317 is less than a radius of the air discharging pipe 314 so that the noise reducing ribs 317 do not reach the center of the air discharging pipe 314. By the open center portion of the air discharging pipe 314, the cleaned air drawn into the inlet 314*a* of the air discharging pipe 314 can be easily discharged to the outlet 314*c* of the air discharging pipe 314.

Hereinbelow, the operation of a vacuum cleaner having the above structure shown in FIGS. 1 through 4 will be described.

As the driving motor is driven, the suction force is generated and transmitted to the suction brush 210 through the cyclone separating apparatus 300. The suction brush 210 draws in the dust on the surface being cleaned together with air. The drawn in air including the dust is guided to the suction path 331 of the cover unit 330 in 'F' direction through the suction brush 210, the extension pipe 220 and the flexible hose 240.

In the connection path 311, a part of the dust-laden air is passed through the mesh filter M mounted in the filter mounting hole 311*a* and is discharged to the outside of the cyclone separating apparatus 300 in 'F1' direction through a discharge filter (not shown) disposed behind the cyclone body 310. The rest part of the dust-laden air is drawn into the air entry path 313*a* of the cyclone chamber 313 in 'F2' direction.

The dust-laden air rotates, ascending from a bottom of the cyclone chamber 313 to an upper part of the cover unit 330. The dust is bounced out by a centrifugal force to the dust collecting chamber 315 disposed on the left of the cyclone body 310 in 'F3' direction. The dust collected in the dust collecting chamber 315 can not flow back to the cyclone chamber 313 due to the blocking member 315*a*.

The cleaned air in which the dust is removed collides with an upper end of the cover unit 330 and therefore descends in 'F4' direction in a rotating manner. The descending air is discharged through the air discharging pipe 314 formed in the center of the bottom of the cyclone chamber 313. Here, a part of the rotary cleaned air is directly discharged through the center of the air discharging pipe 314 whereas the rest of the rotary cleaned air loses the rotary power by the curve portion 317*a* and becomes a straight air current, passing through the straight portion 317*c*, and is discharged out of the air discharging pipe 314.

The cleaned air passed through the air discharging pipe 314 is discharged to the outside of the cyclone separating apparatus 300 in 'F5' direction through the discharge filter (not shown) disposed behind the cyclone body 310.

When the vacuum cleaner is initially driven, the dust-laden air drawn into the suction path 311 is mostly discharged through the mesh filter M mounted in the filter mounting hole 311*a*. However, when the mesh filter M is blocked by the dust, most of the dust-laden air is drawn into the air entry path 313*a* of the cyclone chamber 313. This is because of properties of fluid (here, the dust-laden air) of flowing to a side having relatively lower resistance. By the presence of the mesh filter M, pressure loss generated during the initial driving of the vacuum cleaner can be improved.

Figure 5:
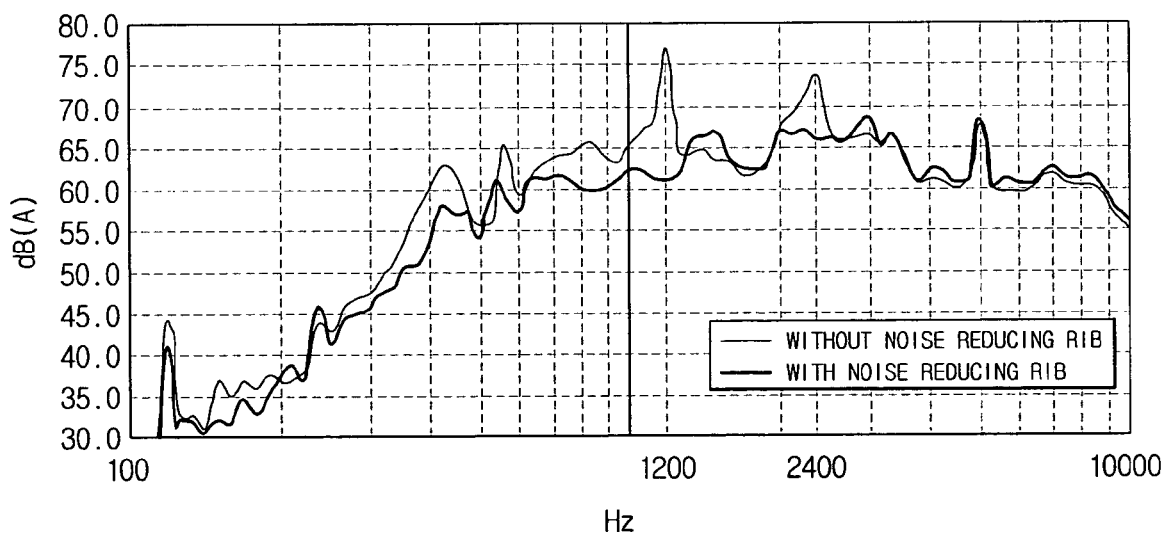
FIG. 5 is a graph comparing decibels of noise according to the presence of the noise reducing rib of FIG. 4.

Hereinbelow, effects of the noise reducing ribs 317 for reducing the noise and loss of pressure will be reviewed with reference to FIGS. 5 and 6.

As to the noise reducing effect, by providing the noise reducing ribs 317, the noise is reduced by 2.8 dB in every frequency band, compared to when the noise reducing ribs 317 are not provided. Especially, according to the noise reducing effect checked in certain frequency bands (1.2 KHz, 2.4 KHz) with respect to a noise generated in the air discharging pipe 314 by Flow Analysis, the noise is considerably reduced by 16.9 dB and 7.5 dB, respectively, by the presence of the noise reducing ribs 317.

Next, the effect of the noise reducing ribs 317 for reducing the loss of pressure is as follows.

Figures 6, 7:
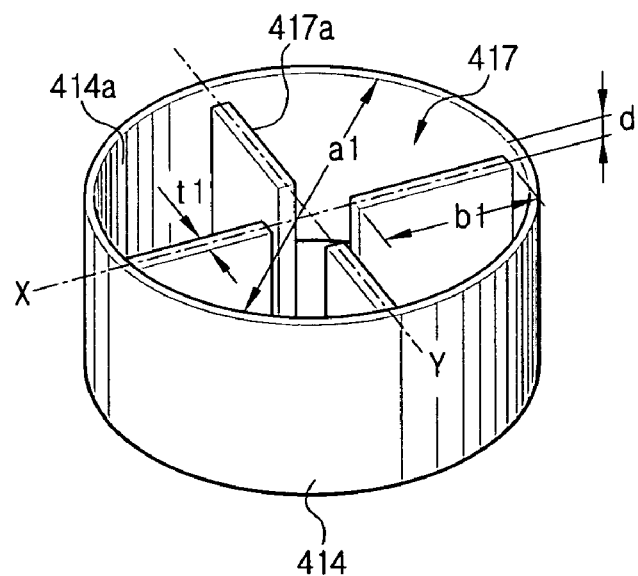
FIG. 6 is a graph comparing decibels of noise and loss of pressure according to the presence of the noise reducing rib of FIG. 4.
FIG. 7 is a perspective view showing a noise reducing rib according to another embodiment of the present invention.

Referring to FIG. 6, when the noise reducing ribs 317 are provided, the loss of pressure is approximately 472 mmH$_2$O. On the contrary, when the noise reducing ribs 317 are not provided, the loss of pressure is approximately 527 mmH$_2$O. Thus, the noise reducing ribs 317 improves the loss of pressure by approximately 55 mmH$_2$O. In other terms, the loss of pressure is reduced by approximately 11% by the presence of the noise reducing ribs 317.

Hereinbelow, another embodiment of the noise reducing ribs 317 will be described.

Referring to FIG. 7, four noise reducing ribs 417 are formed in an air discharging pipe 414 from a certain depth 'd' from a top of the air discharging pipe 414 and respectively on X-Y coordinates crossing a central axis of the air discharging pipe 414.

The noise reducing ribs 417 are formed as a rectangular having a certain thickness 't1' and disposed on an inner wall 414*a* of the air discharging pipe 414. Assuming that a reference numeral 'a1' denotes an inner diameter of the air discharging pipe 417, the noise reducing ribs 417 have a length 'b1' from an inner wall of the air discharging pipe 414 toward the center. Width 'b1' is approximately 0.1 to approximately 0.4 of the inner diameter 'a1' of the air discharging pipe 417. That is, the length 'b1' of the noise reducing rib 417 is less than a radius of the air discharging pipe 414 so that the noise reducing ribs 417 do not reach the center of the air discharging pipe 414.

By the above-structured noise reducing ribs 417, the cleaned air is prevented from becoming a whirling air current in the air discharging pipe 414, and accordingly, the noise caused by such a whirling air current can be reduced.

Figure 8:
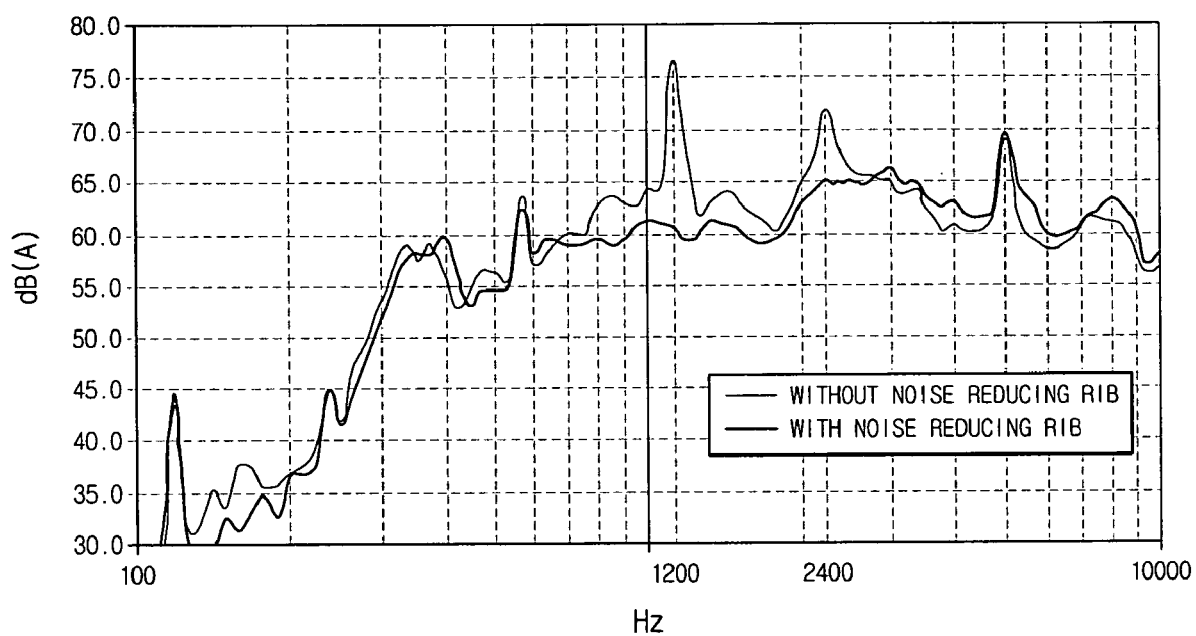
FIG. 8 is a graph comparing decibels of noise according to the presence of the noise reducing rib of FIG. 7.

Referring to FIG. 8, by providing the noise reducing ribs 417, the noise is reduced by 3 dB on the average in every frequency band, compared to when the noise reducing ribs 417 are not provided.

Especially, according to the noise reducing effect checked in certain frequency bands (1.2 KHz, 2.4 KHz) with respect to a noise generated in the air discharging pipe 414 by Flow Analysis, the noise is considerably reduced by 15 dB and 7 dB, respectively, by the presence of the noise reducing ribs 417.

As can be appreciated from the cyclone separating apparatus 300 and the vacuum cleaner having the same according to certain embodiments of the present invention, the noise reducing ribs 317 and 417 mounted in the air discharging pipes 314 and 414 can restrain the cleaned air from generating a whirling air current, and thereby reducing the noise caused in the air discharging pipes 314 and 414 by the whirling air current. Also, the loss of pressure is reduced. Accordingly, the

What is claimed is:

1. A cyclone separating apparatus comprising:
   a cyclone body including a cyclone chamber and a dust collecting chamber;
   a cover unit connected to an upper portion of the cyclone body;
   a door unit openably mounted to a bottom portion of the cyclone body; and
   at least one noise reducing rib formed in an air discharging pipe in the cyclone chamber, wherein the at least one noise reducing rib is formed on the inner wall of the air discharging pipe from a certain death from a top of the air discharging pipe and formed in a certain length toward the center of the air discharging pipe so as not to reach the center of the air discharging pipe.

2. The cyclone separating apparatus of claim 1, wherein the at least one noise reducing rib protrudes on an inner wall of the air discharging pipe toward a center of the air discharging pipe and comprises a curve portion and a straight portion.

3. The cyclone separating apparatus of claim 2, wherein the curve portion is disposed at an inlet of the air discharging pipe while the straight portion is disposed at an outlet of the air discharging pipe.

4. The cyclone separating apparatus of claim 3, wherein the curve portion includes a free end, the free end being rounded to avoid congestion of dust.

5. The cyclone separating apparatus of claim 3, wherein the at least one noise reducing rib comprises a plurality of the noise reducing ribs that are provided at a predetermined interval on the inner wall of the air discharging pipe.

6. The cyclone separating apparatus of claim 5, wherein the plurality of noise reducing ribs comprises four noise reducing ribs.

7. The cyclone separating apparatus of claim 5, wherein the plurality of noise reducing ribs respectively each have a width approximately 0.1 to 0.4 times as large as an inner diameter of the air discharging pipe.

8. The cyclone separating apparatus of claim 1, wherein the air discharging pipe has a substantially circular section and the at least one noise reducing rib is formed on X-Y coordinates crossing a central axis of the air discharging pipe.

9. The cyclone separating apparatus of claim 8, wherein the at least one noise reducing rib has a width of approximately 0.1 to 0.4 times as large as the inner diameter of the air discharging pipe.

10. The cyclone separating apparatus of claim 1, wherein the at least one noise reducing rib has a width that is less than a radius of the air discharging pipe.

11. A vacuum cleaner comprising:
    a cleaner body having a driving motor;
    a suction brush connected to the cleaner body to draw in dust on a surface being cleaned; and
    a cyclone separating apparatus detachably mounted to the cleaner body to separate the dust from dust-laden air drawn in through the suction brush, and
    wherein the cyclone separating apparatus comprises a cyclone body including a cyclone chamber and a dust collecting chamber, a cover unit connected to an upper portion of the cyclone body, a door unit openably mounted to a bottom portion of the cyclone body, and at least one noise reducing rib formed in an air discharging pipe in the cyclone chamber, wherein the at least one noise reducing rib is formed on the inner wall of the air discharging pipe from a certain depth from a top of the air discharging pipe and formed in a certain length toward the center of the air discharging pipe so as not to reach the center of the air discharging pipe.

12. The vacuum cleaner of claim 11, wherein the at least one noise reducing rib is protruded on an inner wall of the air discharging pipe toward a center of the air discharging pipe and comprises a curve portion and a straight portion.

13. The cyclone separating apparatus of claim 11, wherein the at least one noise reducing rib has a width that is less than a radius of the air discharging pipe.

14. A cyclone separating apparatus comprising:
    a cyclone chamber;
    an air entry path for introducing dust-laden air to the cyclone chamber, the cyclone chamber inducing a rotating current to the dust-laden air to separate the dust-laden air into cleaned air and dust;
    an air discharging pipe defining a discharge path for discharging the cleaned air from the cyclone chamber; and
    a noise reducing rib formed on the air discharging pipe in the air discharge path, the noise reducing rib being sufficient to prevent the cleaned air from becoming a whirling air current in the air discharging pipe, wherein the noise reducing rib has a width that is less than a radius of the air discharging pine.

15. The cyclone separating apparatus of claim 14, wherein the noise reducing rib is secured to or integrally formed with the air discharging pipe.

16. The cyclone separating apparatus of claim 14, wherein the noise reducing rib comprises a curve portion disposed at an inlet of the air discharging pipe, the curve portion being sufficient to gradually remove rotary power from the rotating current.

17. The cyclone separating apparatus of claim 16, wherein the noise reducing rib comprises a straight portion disposed at an outlet of the air discharging pipe, the straight portion being sufficient to provide a straight air current to the clean air at the outlet of the air discharging pipe.

18. The cyclone separating apparatus of claim 14, wherein the noise reducing rib comprises a plurality of the noise reducing ribs that are provided at a predetermined circumferential interval on the air discharging pipe in the air discharge path.

19. The cyclone separating apparatus of claim 14, wherein the noise reducing rib is formed in the air discharging pipe a certain depth from an inlet of the air discharging pipe.

* * * * *